April 26, 1932.    J. H. SMITH    1,855,613
RECORDING INSTRUMENT
Filed Dec. 2, 1927    2 Sheets-Sheet 1
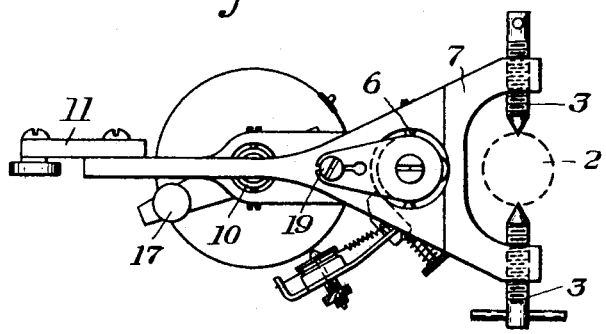
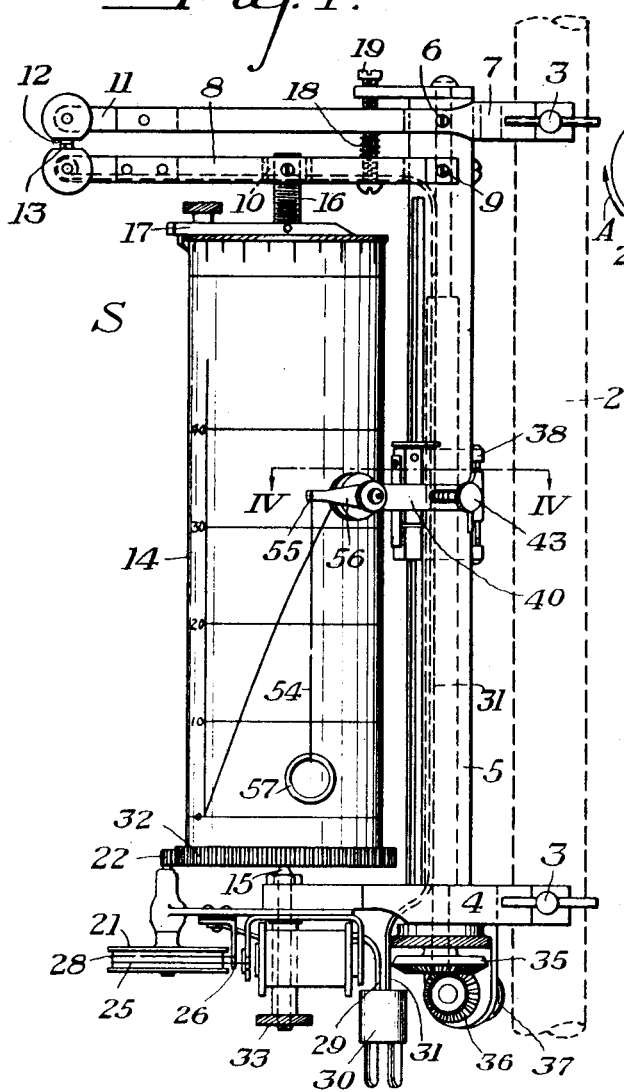
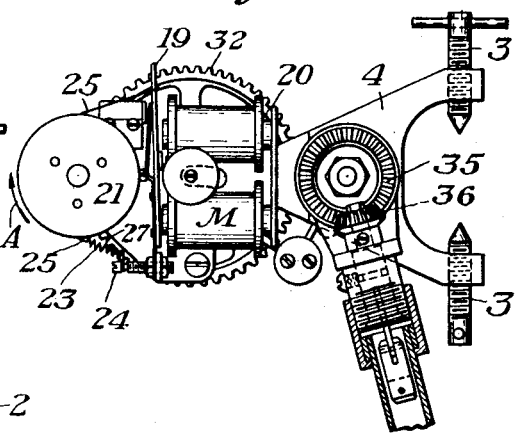
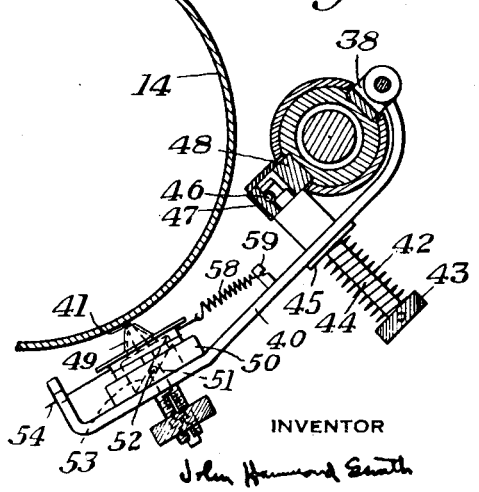
INVENTOR

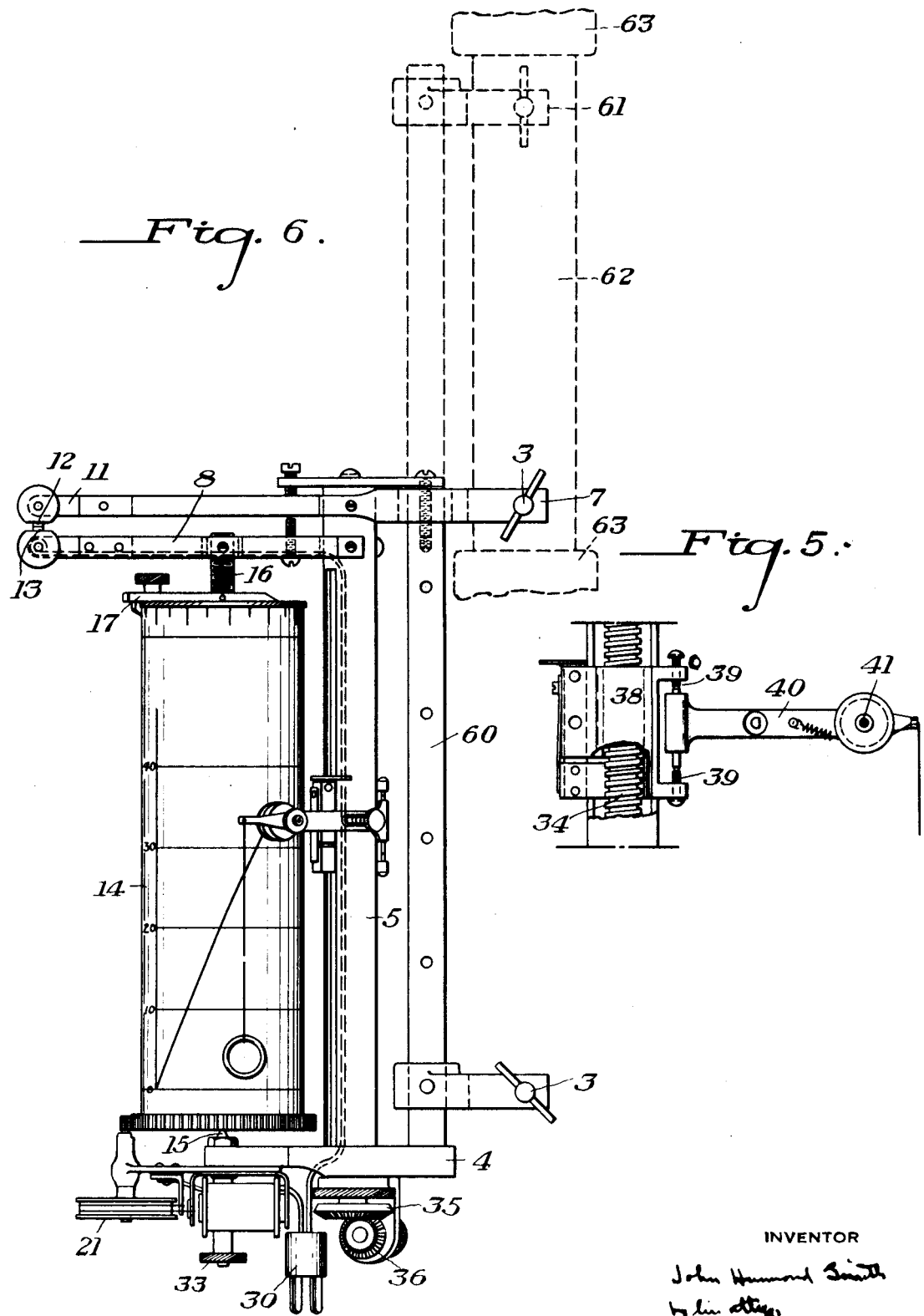

Patented Apr. 26, 1932

1,855,613

UNITED STATES PATENT OFFICE

JOHN HAMMOND SMITH, OF PITTSBURGH, PENNSYLVANIA

RECORDING INSTRUMENT

Application filed December 2, 1927. Serial No. 237,196.

This invention relates to recording instruments and more particularly to an instrument for making stress-strain records of tests on structural specimens.

It relates still more particularly to an instrument controlled by the specimen being tested and by the testing machine for automatically drawing stress-strain diagrams.

It is common practice to test structural specimens such as metal or concrete to determine their tensile and compressive strengths. Machines of various types are used for this purpose, the most common being what is commonly known as the Olsen universal testing machine. In such a machine the specimen is subjected to a slowly increasing stress, the magnitude of which is indicated by a counterpoise which is usually hand operated. The change in dimension of the specimen is measured by means of a suitable gauge.

In order to obtain a record of the strain occasioned in the specimen by reason of the application of a stress of any given magnitude, it is necessary to have a number of operators working simultaneously and calling off the stress and strain readings to a data taker while the test is in progress. Then if it is desired to plot a diagram showing the relative stress and strain throughout the test, this must subsequently be done by hand using the data obtained. This procedure is attended with a number of inherent disadvantages among which are the necessity of providing several operators, the uncertainty of the human element in the taking and recording of readings and the work necessary in plotting the diagram. Readings must, of course, be taken at spaced points throughout the test and the exact strain for any given stress is, therefore, obtainable only at such points, the stress and strain at intermediate points being at best approximated.

I provide a recording instrument for automatically producing a stress-strain record or diagram. The instrument is adapted to be applied to the specimen being tested and to be controlled by the strain of the specimen and by the counterpoise or other means on the testing machine for indicating the stress to which the specimen is subjected throughout the test. The instrument comprises means operable in accordance with the stress on the specimen, means operable in accordance with the strain of the specimen, and means controlled by such means for producing a stress-strain record.

In the accompanying drawings I have illustrated a present preferred embodiment of the invention wherein, Figure 1 is a side elevation of a stress-strain recording instrument showing in dotted lines a specimen to which it may be applied for a tensile test;

Figure 2 is a top plan view of the instrument shown in Figure 1;

Figure 3 is a bottom plan view of the same instrument;

Figure 4 is a partial cross sectional view taken along the line IV—IV of Figure 1;

Figure 5 is a detail view, partly cut away, showing the actuating and supporting means for the recording stylus; and Figure 6 is a view similar to Figure 1 but showing the instrument arranged for a compressive test.

Referring more particularly to the drawings, reference numeral 2 designates a specimen which is mounted for a tensile test in a machine of any desired type. The specimen is gripped at spaced points by suitable gripping members (not shown) on the testing machine. Attached to the specimen by means of clamps 3 is a stress-strain recording instrument designated generally by S. The distance between the clamps 3 is adjusted to a desired gauge length which in standard tests is usually 8″.

The frame of the instrument comprises a lower yoke 4 into which is screw threaded a slotted steel tube 5. Pivoted to the tube 5 at 6 is an upper yoke 7. The clamps 3 are carried by suitable arms in the respective yokes 4 and 7.

A lever 8 is pivoted to the tube 5 at 9. This lever pivotally carries a nut 10 provided with left-handed screw threads. The yoke 7 has an extension 11 which carries a grounded contact point 12. The lever 8 is provided at its extremity with an insulated contact point 13 connected as will be described below.

A record cylinder 14 is provided which is pivotally supported at its bottom by the pivotal bearing 15 and at its top by means of a screw 16 provided with left-handed threads and threaded into the nut 10. The screw 16 is attached to the top of the cylinder by means of a swivel joint and clamp 17. This swivel joint permits adjustment of the cylinder to any convenient position so that the record may be traced at any desired location thereon, as will be more fully described below.

A take-up spring 18 is provided between the yoke 7 and the lever 8 to eliminate all lost motion which might otherwise occur between such members. An adjustable limiting screw 19 serves to hold the yoke 7 in proper position for attachment to the specimen.

Attached to the yoke 4 is a frame 64 carrying a motor M provided with a vibratory armature 19. This motor is of the well-known vibrating type such that when current is supplied to it, the armature 19 is caused to vibrate under the influence of the magnet 20. Journalled in the frame 64 is a drum 21 to whose shaft is keyed a pinion 22. Attached at one end to the armature 19 of the motor M and at the other end through a spring 23 and an adjusting screw 24 to the frame 64 is a thread 25. Attached at one end to a projection 26 on the frame 64 and at the other end through a spring 27 to the adjusting screw 24 is a brake thread 28. Current is supplied to the motor by means of lead 29 attached to a plug 30. The opposite side of the line is connected to a conductor 31 which is insulated and connected to the insulated contact point 13 on the lever 8. The lead from the motor (not shown) is grounded.

When the contact points 12 and 13 are together current will flow through the lead 29 to the motor and thence to the frame, to the contact point 12, to the contact point 13 and back through the conductor 31. This will cause the magnet 20 of the motor to become energized which will in turn cause vibration of the armature 19. Viewing Figure 3, a vibration of the armature 19 to the right causes the thread 25 to rotate the drum 21 a very small distance in the direction of the arrow A. On the return stroke of the armature to the left, the brake thread 28 prevents return rotation of the drum 21 in the opposite direction. The succeeding vibration of the armature 19 to the right advances the rotation of the drum 21 another step in the direction of the arrow A so that while the motor is in operation the drum 21 is caused to rotate in small but rapid increments in the direction of the arrow A and is prevented from retrograde movement by the brake thread 28. When the circuit is broken by separation of the contact points 12 and 13, the magnet 20 of the motor becomes de-energized and vibration of the armature 19 and consequent rotation of the drum 21 ceases. It will thus be seen that whenever the contact points 12 and 13 are together, the drum 21 is rotating in rapid short steps in the direction of the arrow A.

The cylinder 14 is provided with a ring gear 32 with which meshes the pinion 22 keyed to the drum shaft. The rotary motion of the drum 21 is thus imparted to the cylinder 14 except that the cylinder revolves in the opposite direction. The frame 64 carrying motor M and drum 21, together with its shaft and the pinion 22, may be disengaged from the ring gear 32 by operation of the clamp screw 33 which holds such parts in assembled relationship.

Mounted for rotation within the tube 5 is a screw 34. This screw has connected to its bottom a bevel gear 35 with which meshes a bevel gear 36. Connected to the bevel gear 36 is a flexible shaft 37 which is geared at its other end in any suitable manner to the counterpoise on the weighing beam of the testing machine so that movement of the counterpoise along the beam causes rotation of the flexible shaft 37 and consequent rotation of its gear 36 and, through gear 35, of the screw 34. Rotation of the screw 34 is therefore in accordance with the stress exerted on the specimen.

Guided in slots on opposite sides of the tube 5 and provided with a nut engaging the screw 34 is a carriage 38. This carriage is thus prevented from rotation and moves up and down upon rotation of the screw 34. The carriage 38 carries pivots 39 between which is mounted a pencil arm 40. The pencil arm 40 is swingable in a generally horizontal plane. It carries a pencil or stylus 41. The arm 40 is urged toward the cylinder 14 by a spring 42 acting between the head 43 of a pin 44 which it surrounds and a stop 45 on the arm 40. The pin 44 passes through the arm 40 and is provided at its opposite end with a catch 46 cooperating with a suitable projection 47 provided in an extension 48 on the carriage 38. By operation of the pin 44 the arm 40 may be urged against the surface of the cylinder 14 or it may be swung back to inoperative position.

The cylinder 14 carries a paper or recording chart against which the pencil or stylus 41 is pressed. The arm 40 also carries an auxiliary marking device 49 in form of a conical stylus surrounding the stylus 41. The conical stylus 49 is carried on a collar 50 mounted upon a shaft 51. This shaft is provided with a crosswise pin 52 fitting in an inclined cam groove 53 in the collar. Attached to the collar 50 is a cord 54 which passes through a guide eye 55 in an extension 56 on the arm 40. The cord 54 is provided with a ring 57. When the cord 54 is pulled by an operator the collar 50 is caused to rotate, and by reason of the bearing of the inclined cam groove 53 against the pin 52, the collar will at the same time be urged toward the cylinder 14 until the conical stylus 49 touches the paper or chart, thus making a circular mark thereon surrounding the mark made by the stylus 41. A spring 58 is connected to the collar 50 and to a projection 59 on the arm 40 for returning the collar to its normal position when the cord 54 is released. By means of this arrangement a mark may be made on the chart at any time desired by the operator simply by grasping the ring 57 and pulling the cord. This provision is useful in determining the stress and strain in timed increments.

The operation of the instrument is as follows:

Assuming the instrument applied to a specimen about to undergo a tensile test and that the contact points 12 and 13 are just out of contact, when a load is applied to the specimen it will begin to elongate and thus move the clamps 3 apart. Assuming the lower clamp to remain stationary with respect to its point of attachment to the specimen, the upper clamp will move upwardly, causing the yoke 7 to turn about its pivotal connection 6 with the tube 5 and lowering the extension 11 thereon which carries the contact point 12. The contact point 12 will engage the point 13, thus actuating the motor M and causing rotation of the cylinder 14 in the direction of the arrow A of Figure 3, as above described. Rotation of the cylinder also causes rotation of the screw 16 attached thereto and rotation of such screw within the nut 10 pivoted in the lever 8. Such rotation draws down the lever 8 about its pivotal connection 9 with the tube 5 until the contact points 12 and 13 are separated, when the motor is stopped and rotation of the cylinder is discontinued until the specimen has been elongated sufficiently to again bring the points 12 and 13 together, when the motor will again be actuated to cause a further rotation of the cylinder and a further breaking of the circuit at the contact points. In actual practice the rotation of the cylinder 14 is found to be quite uniform as though it were being continuously and positively driven.

At the same time as rotation of the cylinder 14 is being effected, as above described, rotation of the screw 34 is also caused by movement of the counterpoise along the weighing beam. Rotation of the screw 34 causes motion of the carriage 38 axially thereof and also axially of the cylinder 14 so that the stylus 41 moves in the direction of an element of the cylinder.

Rotational movement of the cylinder 14 being in accordance with the strain of the specimen and movement of the carriage 38 and the stylus 41 being in accordance with the stress on the specimen and substantially at right angles to the rotational movement of the cylinder, it will be seen that a stress-strain diagram will be plotted on the paper affixed to the cylinder. The horizontal dimension of this diagram will represent the strain of the specimen and the vertical dimension will represent the stress exerted thereon. The paper may be provided with lines indicating the measure of the respective quantities and by suitable adjustment of the instrument the stress-strain curve may be made to begin at the origin of the chart.

The instrument is adapted for producing a stress-strain record of a compression test as well as of a tension test. When used with a specimen being tested under compression an extension 60 (Figure 6) is provided which is connected to the yoke 4 and extends beyond the yoke 7, being provided with a clamp 61 similar in all respects to the lower clamp 3 (Figure 1). In Figure 6 a specimen 62 is shown as under compression between heads 63. Movement of the clamp 61 and the upper clamp 3 toward each other when a specimen is being tested under compression effects a movement of the upper and lower yokes which is precisely the same as that effected in carrying out a tensile test.

By means of the instrument a stress-strain diagram is automatically drawn without any attention from the operator. It is considerably more accurate than a diagram which may be drawn using data obtained on a test conducted solely by taking readings. Time readings may be conveniently taken by merely grasping the ring 57 and pulling the cord 54 to cause the conical stylus 49 to make a mark upon the chart. For convenience a metallic stylus and metallic coated paper are preferred.

While I have shown and described a present preferred embodiment of the invention, it is to be understood that the same is not limited to the form shown but may be otherwise embodied within the scope of the following claims.

I claim:

1. A stress-strain recording instrument comprising means for engaging a specimen, electric contact means connected thereto and operable in accordance with movement of the specimen engaging means to close an electric circuit, electric actuating means in the circuit, recording means actuated thereby when the circuit is closed, means controlled by the recording means to cause breaking of the circuit by the contact means, and means operable in accordance with the stress on the specimen and cooperating with the recording means to produce a stress-strain record.

2. A stress-strain recording instrument comprising a screw threaded post rotatable in accordance with the stress on a specimen, recording means mounted for movement axially of the post upon rotation thereof, and record receiving means movable in accordance with the strain of the specimen and cooperating with the recording means to produce a stress-strain record.

3. A stress-strain recording instrument adapted to engage a specimen at spaced points and comprising an electrically controlled record cylinder, means for rotating such cylinder in accordance with the strain of the specimen, means connected with the cylinder for interrupting its rotation, and means reciprocable along the surface of the cylinder in accordance with the stress of the specimen to produce a stress-strain record.

4. In a stress-strain recording instrument, record receiving means, a stylus cooperating therewith to produce a stress-strain record, and an auxiliary stylus operatively connected in juxtaposition to the instrument and normally out of contact with the record receiving means and adapted to be projected into contact therewith at any desired point in the test.

5. In a stress-strain recording instrument, record receiving means, a stylus cooperating therewith to produce a stress-strain record, and an auxiliary stylus surrounding the first mentioned stylus and manually operable to mark a desired point on the record.

6. In a stress-strain recording instrument, record receiving means, a stylus cooperating therewith to produce a stress-strain record, an auxiliary stylus normally out of contact with the record receiving means, and cam means for operating the auxiliary stylus.

7. In a stress-strain recording instrument, means movable in accordance with the strain of the specimen, recording means, and electric actuating means controlled by the first mentioned means and effective for operating the recording means.

8. In a stress-strain recording instrument, a motor having a vibratory armature, a drum, means connected with the armature for rotating the drum, means for preventing retrograde movement of the drum, recording means, and means connecting the drum and recording means.

9. In a stress-strain recording instrument, a vibratory member, a drum, flexible means connected to the vibratory member and extending around the drum for rotating it in one direction, and flexible means also extending around the drum to prevent retrograde movement thereof.

10. In a stress-strain recording instrument, a vibratory member, a drum, a thread connected at one end to the vibratory member and extending around the drum for rotating it in one direction, and a second thread engaging the drum to prevent retrograde movement thereof.

11. A stress-strain recording instrument adapted to engage a specimen at spaced points, such instrument having co-operating electric contacts controlled by movement of the specimen and means effective upon operation of said contacts for providing a test record.

12. A stress-strain recording instrument adapted to engage a specimen at spaced points, such instrument having co-operating relatively movable circuit making and breaking means controlled by movement of the specimen and means effective upon operation of said first-mentioned means for providing a test record.

13. In a recording instrument, record means adapted to engage a specimen at spaced points, electric contact means adapted to be controlled by the specimen being tested and effective for causing movement of the record means, and means effective upon movement of the record means for in turn controlling the contact means.

14. In a recording instrument, record means, a thread, means for causing vibration of the thread and means actuated upon vibration of the thread to cause motion of the record means.

15. In a recording instrument, a drum, a thread co-operating with the surface thereof, and means for causing vibration of the thread to rotate the drum.

16. In a recording instrument, a drum, a thread co-operating with the surface thereof, means for causing vibration of the thread to rotate the drum and means for adjusting the tension on the thread.

17. In a recording instrument, a drum and a vibratable thread and a stationary thread cooperating to rotate the drum.

18. In a recording instrument, a drum and a vibratable thread and a stationary thread against the surface of the drum for rotating it.

In testimony whereof I have hereunto set my hand.

JOHN HAMMOND SMITH.